United States Patent [19]

Kavanagh et al.

[11] 4,049,068
[45] Sept. 20, 1977

[54] PRICE LABELING SYSTEM WITH FLOATING ZERO REFERENCE

[75] Inventors: George Kavanagh, Ithaca, N.Y.; John L. Caron, Oakland, Calif.

[73] Assignee: Hi-Speed Checkweigher Co., Inc., Ithaca, N.Y.

[21] Appl. No.: 682,852

[22] Filed: May 3, 1976

[51] Int. Cl.² ............................................. G01G 11/04
[52] U.S. Cl. ...................................... 177/25; 177/145; 177/165; 235/151.33
[58] Field of Search .................... 177/25, 165, DIG. 3, 177/145, 1; 235/151.33, 168

[56] References Cited

U.S. PATENT DOCUMENTS

| | | | |
|---|---|---|---|
| 2,974,863 | 3/1961 | Williams | 235/151.33 |
| 3,375,357 | 3/1968 | Dekker | 235/151.33 |
| 3,853,267 | 12/1974 | Cadwell | 177/165 X |
| 3,977,484 | 8/1976 | Kammerer | 177/165 |

FOREIGN PATENT DOCUMENTS 254,830  3/1964  Australia ......................... 235/151.33

*Primary Examiner*—Joseph W. Hartary
*Attorney, Agent, or Firm*—Bean, Kauffman & Bean

[57] ABSTRACT

A price labeling system employs a highly linear weight-responsive transducer. Two weight measurements are taken with respect to each incoming article, one representing the unladen weight of the scale platform and the other representing the laden weight of the scale platform. Data representing these two measurements are subtracted to provide gross weight of the article and thereby relieving the system of the need to provide a stable "zero" reference when the scale is unladen. The data representing the outputs of the transducer are expanded in range, are subtracted and are divided by the range expansion factor to provide decreased uncertainty in resolution of the analog-to-digital conversion of the transducer outputs. A central processing unit computes the net weight and price of the article on the basis of tare weight and price per pound entries.

14 Claims, 16 Drawing Figures

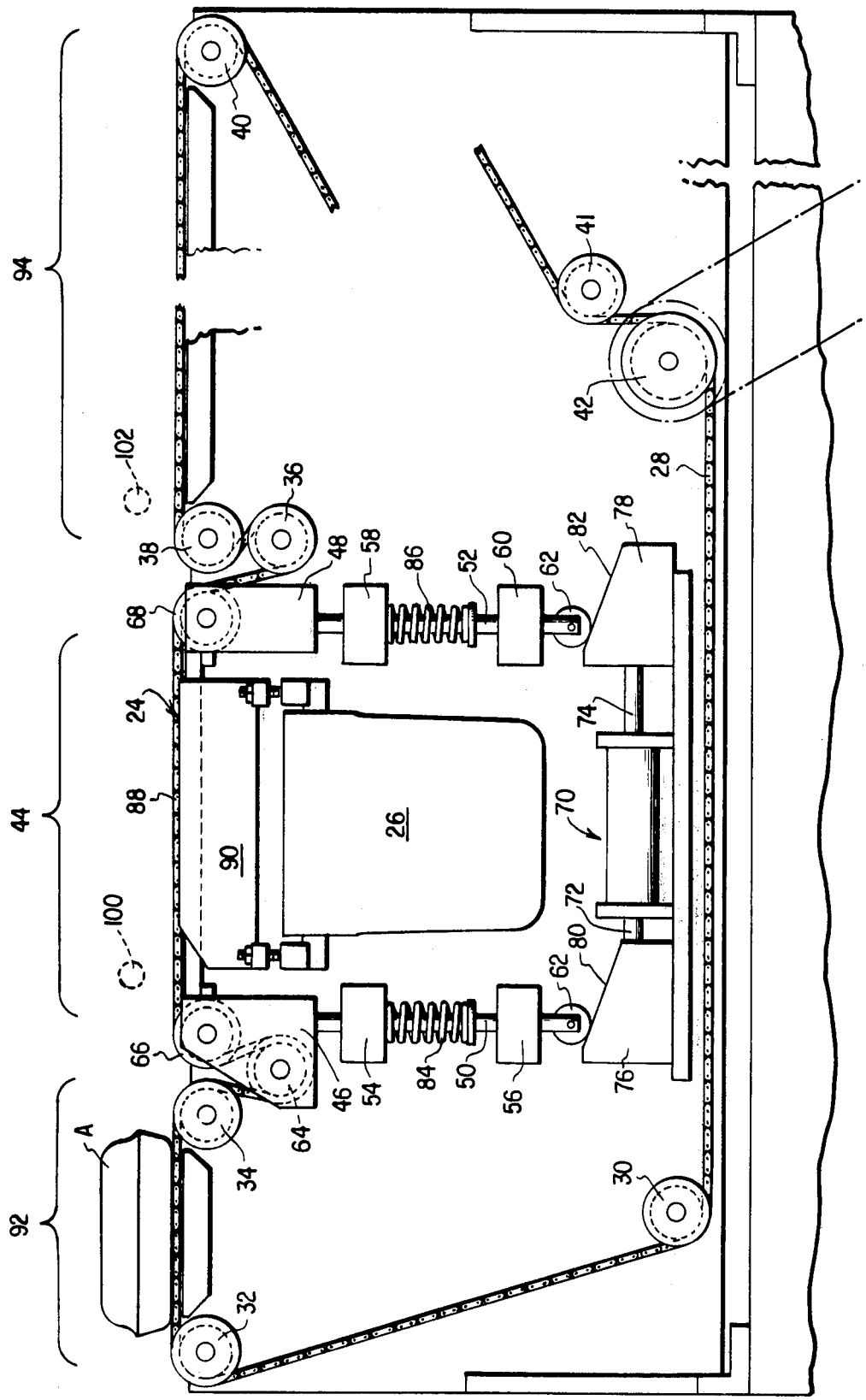

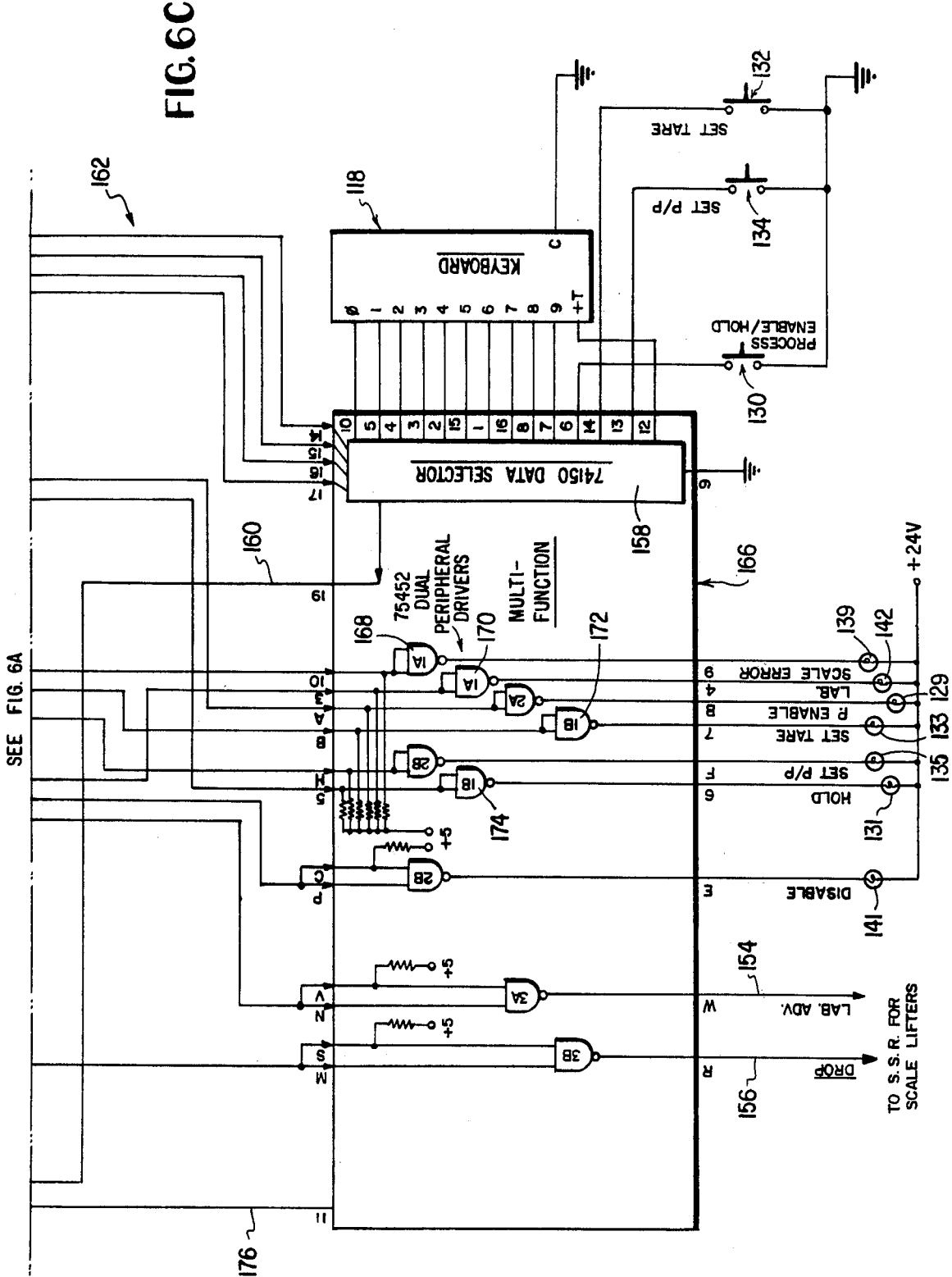

PRICE LABELING SYSTEM WITH FLOATING ZERO REFERENCE

CROSS REFERENCE TO RELATED APPLICATION

This application discloses subject matter in common with application Ser. No. 536,301, now U.S. Pat. No. 3,955,665, filed Dec. 26, 1974, which application is incorporated herein by reference thereto.

BACKGROUND OF THE INVENTION

Electronic techniques have been applied to the weighing art. Electronic scales and weighing systems have been developed which provide a relatively rapid readout in digital format without the use of springs and similar mechanical devices. A particularly useful system involves the use of a load cell or similar transducer which provides an analog voltage or signal which is proportional to the weight of an unknown load to a high degree of linearity. Amplifiction and analog-to-digital conversion is employed to provide a digital output signal corresponding to the weight of the load. Systems of this type have been developed commercially which are capable of displaying the weight of a load accurately to the nearest hundredth of a pound within several seconds.

Weight-price labeling systems have also been developed using the above format in conjunction with commercially available solid state microprocessors in which the net weight of an article is computed by subtracting a set tare weight from the measured gross weight of an article and then computing the article price by multiplying the net weight by the price per unit weight. In these systems, a keyboard is employed to enter the price per unit weight into the microprocessor and also to enter the tare weight data. Optionally, the tare weight data may be entered directly from the scale by loading a representative empty article container on the scale, the system being provided internally with circuitry which allows entry of this measurement as the set tare weight data when this option is exercised.

In conjunction with visual display of the set tare weight, net weight, price per unit weight and computed article cost, a label printing device is operated which prints the desired information on a label for application to the article package.

Systems of this latter type have found wide applicability in retail outlets such as supermarkets and the like, and are likely to encounter increasing demand for various reasons.

However, such systems require sophisticated and expensive electronic circuitry in order to attain and maintain the accuracy which is inherent with present electronic weighing transducers. For example, although a state of the art load cell or similar transducer will be highly linear over a particular load range and therefore is capable of yielding weight readings of high accuracy within that range, normal electronic drift in the equipment which processes the transducer signal may well introduce error which substantially reduces the overall accuracy. Thus, substantial effort has been expended in order to establish a stable "zero"0 reference from which the weight measurements are taken. Obviously, if stable zero is not achieved, the measured gross weight which provides the basis for all computations will correspondingly be in error.

A further problem with present systems is the fact that due to the discrete-step nature of any analog-to-digital conversion, the least significant bit obtained by the conversion is an approximation whose accuracy is only ±½ the least significant bit.

BRIEF SUMMARY OF THE INVENTION

The present invention is concerned basically with a weighing system which avoids disadvantages of the prior art. This invention is concerned with the concept of computing gross weight instead of the conventional direct measurement thereof. Specifically, the present system employs a routine in which two weight measurements are made per article processed, the article gross weight being computed from these two measurements. One measured weight provides data corresponding to the unladen scale and the other measured weight provides data corresponding to the laden scale, the computer means deriving the computed gross weight of the article by subtracting the unladen weight data from the laden weight data. In this fashion, the concept of stable zero has no relevance and this problem which plagues the prior art is completely eliminated. Also, the problem of product build-up in the scale does not introduce errors except in the rare instance wherein product build-up occurs subsequent to an unladen weight measurement but prior to the immediately succeeding laden weight measurement.

Because an analog-to-digital conversion is effected during each weight measurement and since the data representing these two measurements are subtracted to yield gross weight data, the uncertainty in resolution associated with analog-to-digital conversion can be quite large and, in fact, due to the subtraction step, will be twice as large as would otherwise be the case. In order to avoid this problem and in fact to decrease the uncertainty of resolution which normally prevails, the gain of the analog amplification stage is expanded by a factor of four. Then, after these unladen and laden data have been A/D converted and mathematically subtracted to yield a differential weight representation the result is then divided by four to yield a differential weight representation in units of pounds. This yields a reduction of the uncertainty by the factor ¼ as compared to what it would be without the range expansion. Obviously, other factor values may be used but a factor of at least two is desired in any case, as will be evident.

Contemporary systems do not employ set tare weight entry which is closer than to the nearest hundredth pound. However, it is often possible to determine average tare weight to the nearest thousandth of a pound. Consequently, the present system provides for the entry of tare weight data to the nearest thousandth of a pound. This is very beneficial in those cases where it can be done and if the production run is long enough, or if the weight per article is small and the price per pound is high. The central processing unit is capable of computing on the basis of the more accurate tare weight entry and even though rounding to the nearest hundredth of a pound is employed, the long term results are beneficial to the user.

More specifically, this invention is utilized in conjunction with a high speed weighing system in which successive articles are conveyed along a path passing over and above the weighing transducer, the conveyor means being controlled transiently to deposit each article on the weighing device. A sensor detects the presence of an incoming article to control the conveyor means and also to initiate the computing cycle wherein the unladen and laden weight data are provided as inputs to the microprocessor. Preferably, the conveying means takes the form disclosed in commonly assigned application Ser. No. 536,301, filed Dec. 26, 1974, which application is incorporated herein by reference thereto.

BRIEF DESCRIPTION OF THE DRAWING FIGURES

FIG. 2 is an enlarged vertical section taken longitudinally through the weighing station and showing certain details of construction with respect to the mechanical aspects of the device;

Figure 7:
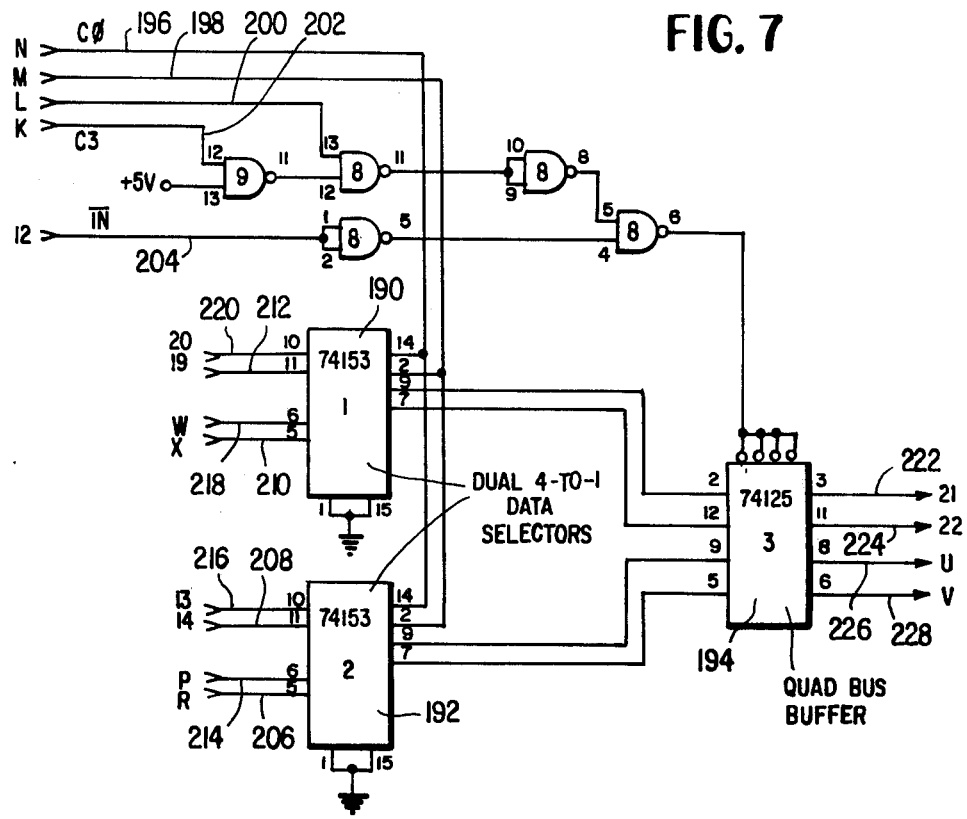
Figure 6A:
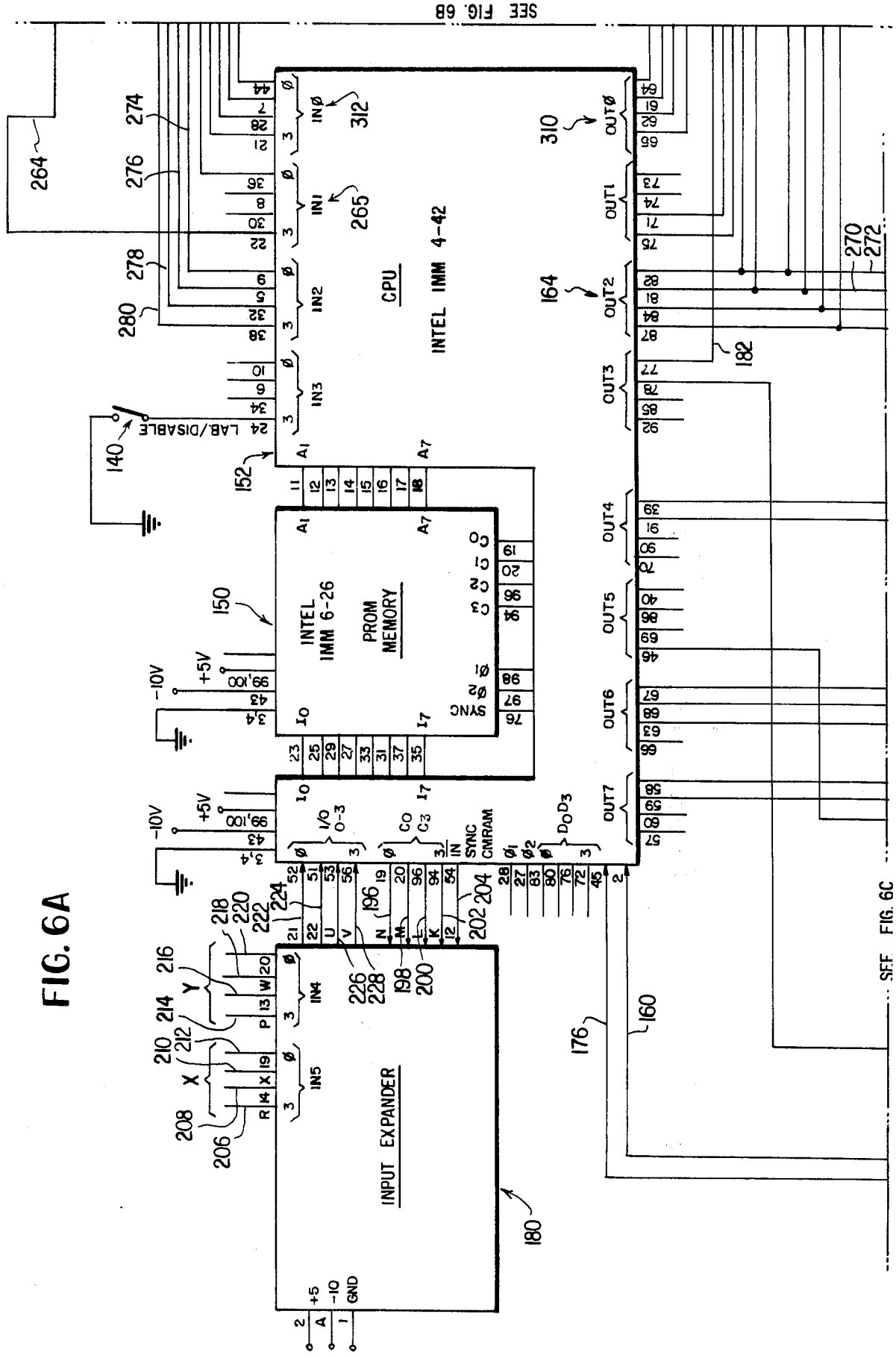
Figure 6B:
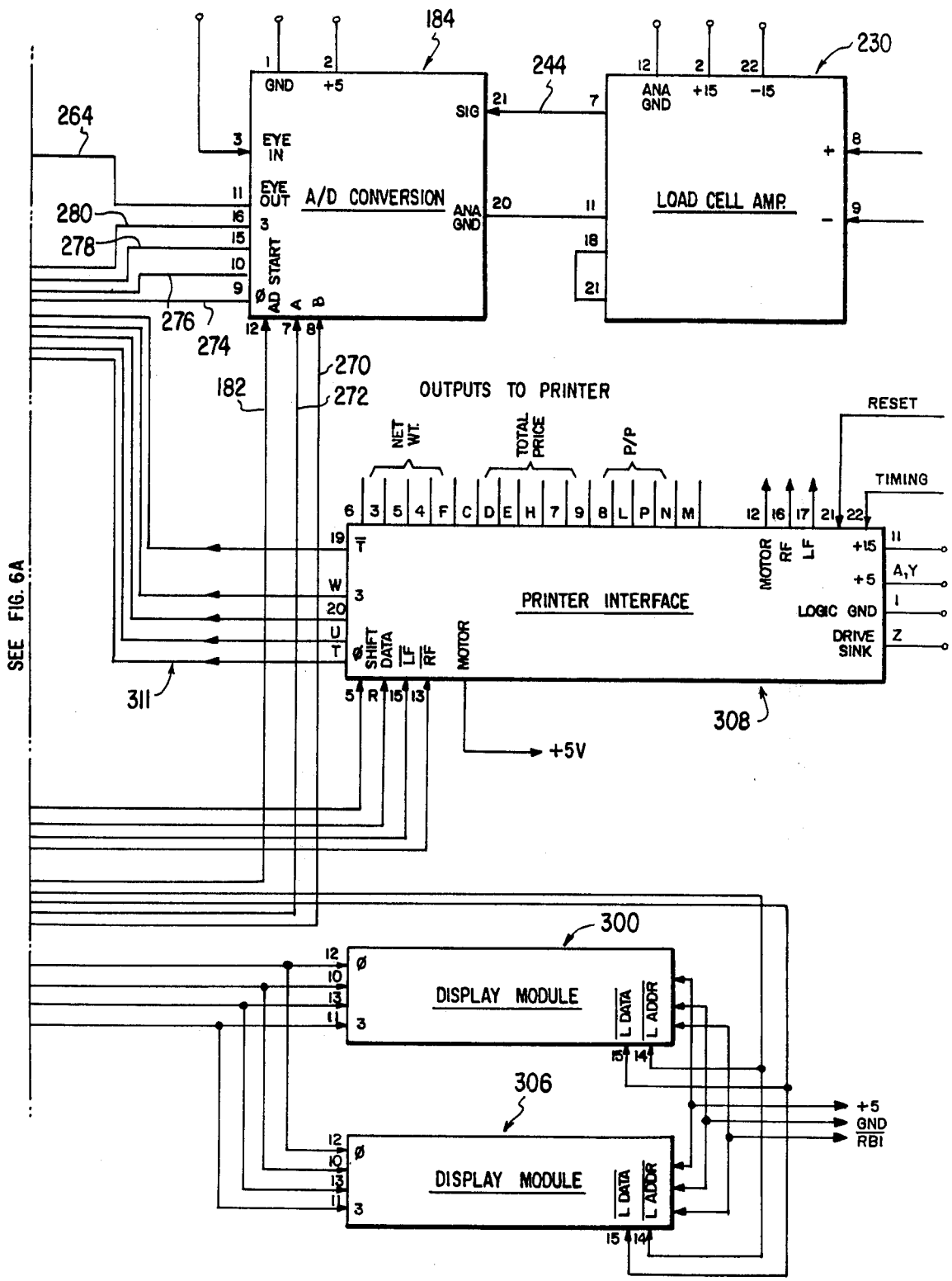
Figure 8:
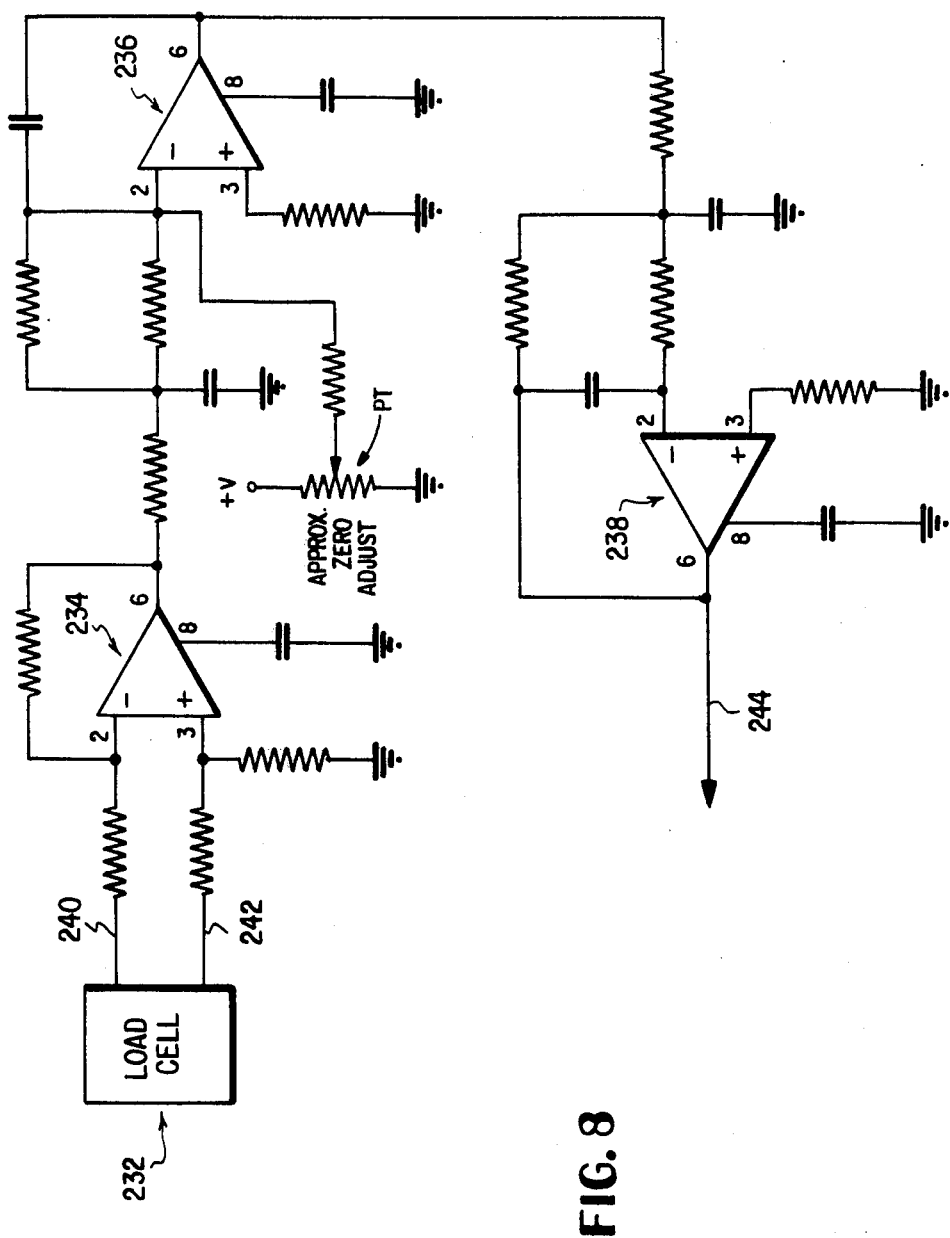
Figure 9:
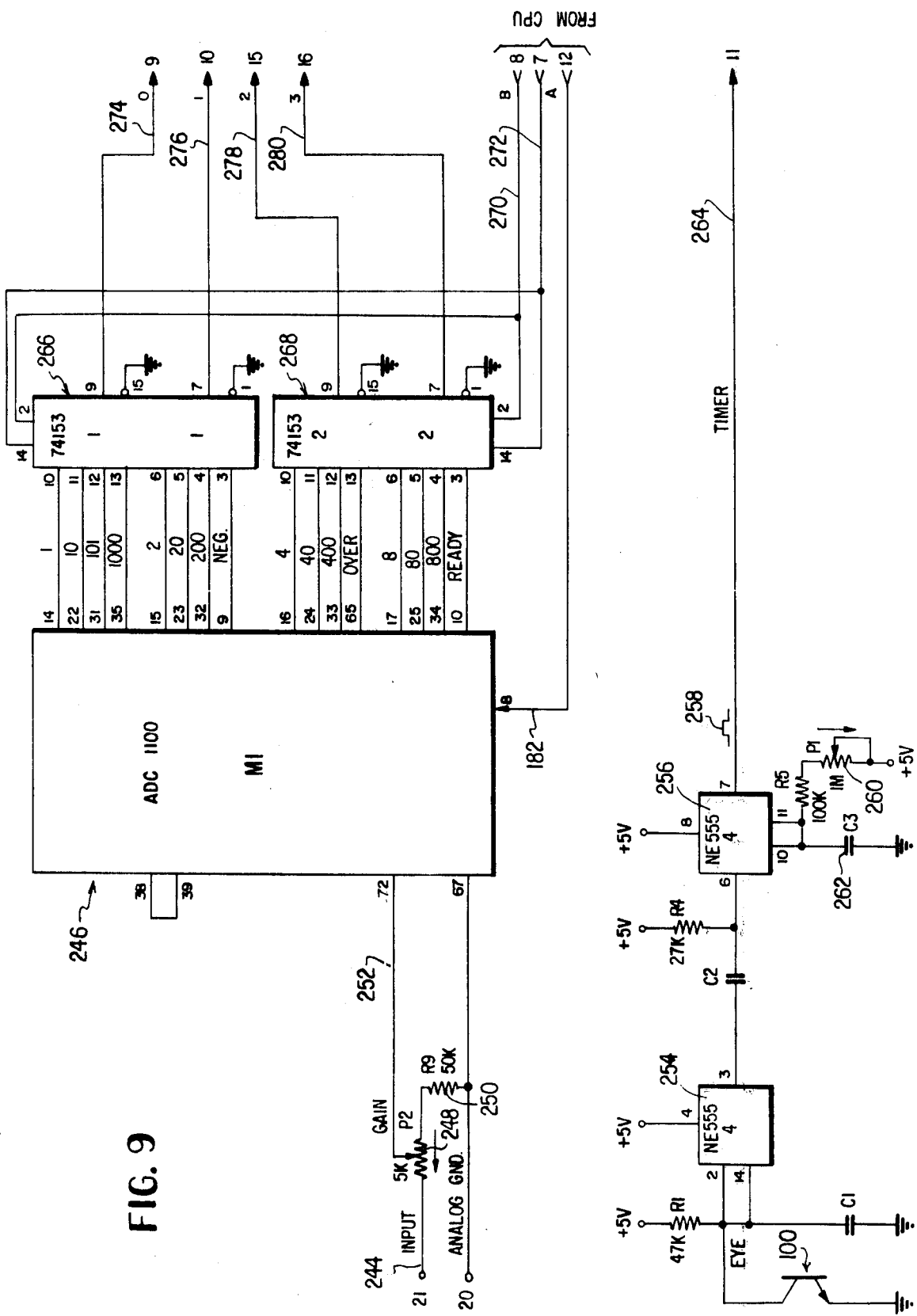

FIG. 6A taken in conjunction with FIGS. 6B and 6C cumulatively illustrate the schematic arrangements of the various components of the electrical system of the machine;

FIG. 7 is a detailed circuit illustration of the input expander of FIG. 6A;

FIG. 8 is a detailed circuit illustrating the load cell circuit board of FIG. 6B;

FIG. 9 is a detailed circuit illustrating the analog-to-digital conversion board of FIG. 6B; and FIGS. 10-14 are logic flow diagrams illustrating the manner in which the central processing unit is programmed.

DETAILED DESCRIPTION OF THE INVENTION

Reference is had more particularly at this time to FIGS. 1-5 inclusive which show various details of the mechanical aspects of the system with which the present invention is associated. The mechanical aspects are disclosed in detail in copending application Ser. No. 536,301 filed Dec. 26, 1974 and same is incorporated herein by reference thereto.

Figure 1:
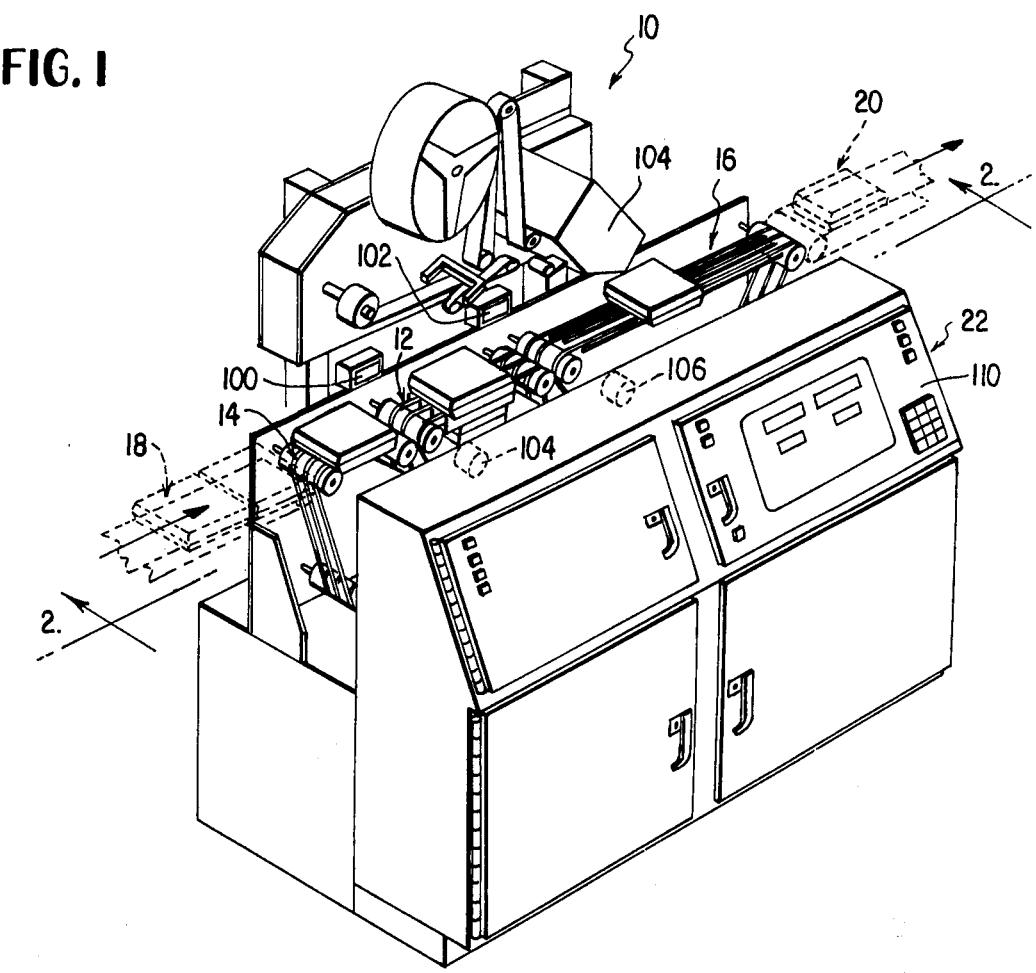
FIG. 1 is a perspective view of the machine according to the invention and illustrating in phantom lines the infeed and discharge conveyors which may be associated therewith.

FIG. 1 illustrates the overall system and will be seen to include the printing and labeling assembly generally indicated by the reference character 10, the weighing station indicated generally by the reference character 12 to one side of which is the infeed conveyor section 14 and to the other side of which disposed the outfeed conveyor system 16. The conveyor section 14 receives articles from a delivery conveyor indicated generally by the reference character 18 and articles are removed from the system by the discharge conveyor mechanism 20. The operator's side of the system embodies a control console indicated generally by the reference character 22 which includes certain control buttons and control lights as well as a keyboard and, in addition, a display section all as described hereinafter.

Figure 3:
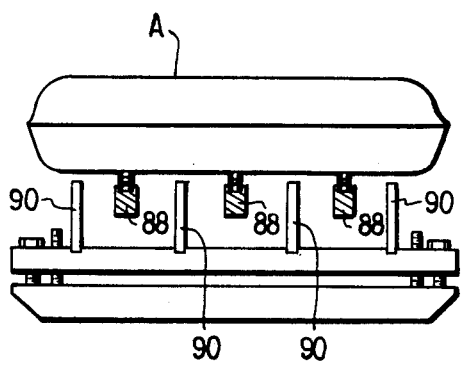
FIG. 3 is a view on enlarged scale taken transversely through the weighing station and showing the relative disposition of component parts prior to lowering of the article.
Figure 4:
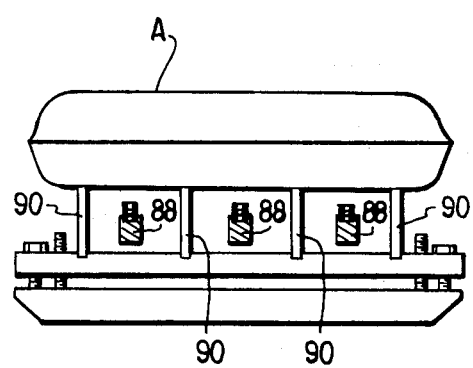
FIG. 4 is a view similar to FIG. 3 but illustrating the disposition of component parts after the article has been lowered onto the scale platform.

FIG. 2 illustrates the basic principle of the mechanical aspects of the weighing station and as shown, there is provided a weighing platform assembly indicated generally by the reference character 24 which acts upon a suitable load-responsive transducer housed in the stationary support device 26. The transducer may be a commercially available strain guage device which is of highly linear nature within a specified weight range and which is characterized by requiring very little total movement of the weighing platform 24. An endless chain or conveyor system comprising a plurality of lengths of endless chain or the like 28 is trained over a plurality of fixed idlers indicated by the reference characters 30, 32, 34, 36, 38, 40 and 41 and over the drive sprocket 42 as is shown. An essentially constant velocity input drive is imparted to the chains or other endless conveyor members by the drive sprocket 42. The weighing station which is represented by the section 44 is characterized by the two standards or brackets 46 and 48 which are carried by the vertically slidable posts 50 and 52 respectively. These posts are slidably guided in the fixed support members 54, 56, 58 and 60 and the bottom of each post 50 and 52 is provided with a cam follower in the form of a roller such as those indicated by the reference character 62. The bracket 46 carries a pair of idler rollers 64 and 66 and the bracket 48 carries an idler roller 68. A double acting pneumatic cylinder or the like indicated generally by the reference character 70 is provided with piston rod portions 72 and 74 which are connected to the slidable cam blocks 76 and 78 and when the device 70 is actuated, the cam blocks 76 and 78 are translated to the left in FIG. 2 so that the followers 62, under the action of the compression springs 84 and 86, will remain in engagement with the inclined ramp portions 80 and 82 consequently to cause lowering of the brackets 46 and 48. The effect of this can be seen in FIGS. 3 and 4. In FIG. 3, the normal disposition of the endless conveyor portions 88 in the weighing station section 44 are shown in their normally disposed elevated positions whereby to support an article A in elevated position above the rails or plates 90 which form the weighing platform 24 proper. FIG. 4, on the other hand, shows the conveyor sections 88 in their lowered positions corresponding to the lowered positions of the brackets 46 and 48. A characteristic feature of the system thus far described is that as the conveyor sections 88 are lowered, the action of the three idlers 64, 66 and 68 is such that although the infeed and outfeed sections 92 and 94 of the endless conveyor continue their constant velocity movement, the sections 88 are transiently affected by a deceleration component due to the lowering of such sections 88. The inclination of the ramps 80, 82 and of the translational movement of the blocks 76 and 78 can be so adjusted that an article A can be decelerated correspondingly by this action.

Two sensor devices as indicated in FIG. 1 by the reference characters 100 and 102 are retroreflective photosensors and have associated reflectors 104 and 106. The sensors are provided to control the timing of the system with respect to the movement of the incoming articles A. As can be seen in FIG. 2, when the beam of the first sensor 100 is broken, as the article enters onto the conveyor sections 88 from the infeed section 92, two effects occur. First, the output signal of the unladen scale platform 24 will be sampled and the mechanism 70 will be actuated whereby to lower the flight sections 88 and deposit the article A centrally upon the weighing platform 24. The cycle then continues with the raising of the conveyor sections 88 and a second sampling before the article is engaged by the conveyor; and as the article is transferred to the discharge or outfeed section 94, it breaks the beam of the second sensor 102 which commences the price label application to the corresponding article. Both of the sensors 100 and 102 are movable longitudinally along the system so as to be adjustable in precise position to achieve the proper timing actions when depositing the articles on the weighing platform and in positioning them properly in relation to the label applicator 104 as illustrated in FIG. 1.

An important characteristic of the present invention will now be apparent, namely, that two output signals from the weighing transducer are obtained for each article under consideration, one of these signals indicating the unladen weight of the scale platform and the second indicating the laden weight of the scale platform. This is an important consideration inasmuch as it liberates the system from the serious constraint of having to provide a stable zero for the system. As previously explained, and as will be evident, prior art devices which utilize only a signal when the scale is laden must provide means which positively assures that the unladen output signal will be zero and will remain so during operation. Whereas such a stabilized zero can be achieved by utilization of complex electronic circuitry, it is not only expensive to achieve this but it also does not accommodate for gross product built-up on the scale platform which may easily occur. According to the present invention, the system is immune from product build-up on the scale platform (except in the rare instance in which such build-up should occur between readings) and as noted the constraint of providing for a stable zero is eliminated.

Figure 5:
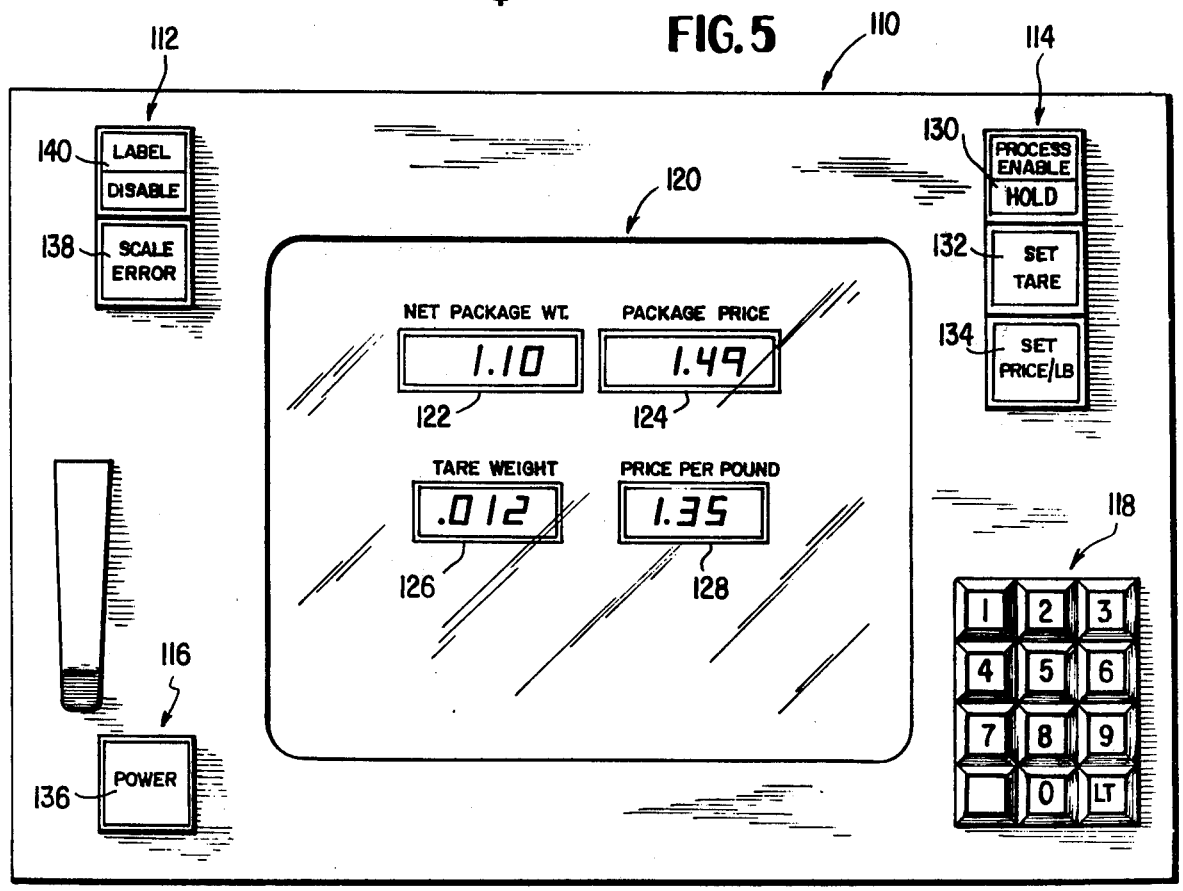
FIG. 5 is a face view showing a portion of the control and display of the machine.

Referring now more particularly to FIG. 5, the operator control panel is illustrated therein and is designated generally by the reference character 110 which, with reference to FIG. 1 will be seen to occupy the right-hand portion of the machine. Three regions containing illuminated or back-lighted push buttons are positioned on the front panel as indicated generally by the reference characters 112, 114 and 116 and, in addition, a keyboard 118 is provided. Further, a display region 120 is provided which contains four areas of display as indicated by the reference characters 122, 124, 126 and 128. The push button switches individually are indicated by reference characters 130, 132, 134, 136 and 140 in FIGS. 6A, 6B and 6C, and the corresponding buttons of these switches are indicated by like reference characters in FIG. 5.

The machine is powered up by depressing the switch button 136, which causes the back-lighting bulb (not shown) to be illuminated. The remaining back-lighting bulbs are illustrated in FIG. 6C and are designated therein by the reference characters 129, 131, 133, 135, 139, 141 and 142. The scale error bulb 139 illuminates, for example, when the tare weight entry exceeds the measured weight of the article. The bulb 142 back-lights the "label" section of the button of the switch 140 when this switch is open whereas the bulb 141 back-lights the "disable" section when the switch 140 is closed. The bulb 129 back-lights the "process enable" section of the button of the switch 130 when the CPU commands whereas the bulb 131 back-lights the "hold" section when the CUP commands. The bulb 133 back-lights the button of the switch 132.

Reference is had to FIGS. 6A, 6B and 6C which are a composite illustrating various circuit boards and their functional interrelationships and electrical interconnections constituting the entire system according to the invention. Of the circuit boards illustrated in these three Figures, the boards 150 and 152 are commercially available items as indicated in FIG. 6A. FIGS. 6A, 6B and 6C do not show the labeler control circuitry, same constituting no part of the present invention. However, the outputs to the labeler control circuit is provided by the conductor 154 indicated in FIG. 6C. The output which controls the conveyor dropping/lifting device 70 in FIG. 2 is provided at the conductor 156, specifically the output at 156 is applied to a solid state relay controlling the pressurized air supply valve for the device 70. The keyboard 118 is a commercially available device and may be of any conventional form utilizing a set of normally open momentary contact switches each of which is grounded when the corresponding button is depressed. The input lines to the keyboard are provided in parallel with the switches 130, 132 and 134 as illustrated in FIG. 6C. The grounded outputs from the keyboard 188 and/or the switches 130, 132 and 134 are applied as inputs to the data selector 158 and a single output appears at the conductor 160. according to the code present on the four input lines 162, the conductor 160 being applied to the circuit board 152 shown in FIG. 6A. The conductors 162 are the select code lines which determine which of the inputs is applied to the output conductor 160 and the code present at the lines 162 is determined by the output port 164 of the central processing unit 152.

The remainder of the multifunction board 166 consists essentially of the 75452 dual peripheral drivers such as the set consisting of the gates 168, 170, 172 and 174 which are contained in two integrated circuit chips. Additionally, the board 166 includes a power on reset circuit of conventional form (not shown) which applies a reset state for a predetermined time on the conductor 176 after application of power and this signal is applied to the central processing unit (CPU) board 152 as indicated in FIG. 6A.

The input expander circuit board 180 is provided to increase the number of input ports to the central processing board 152. Specifically, the X and Y inputs as illustrated in FIG. 6A are provided and they are connected to thumb wheel switches (not shown) which merely set a BCD number to be read as an input by the central processing unit to determine certain timing functions of the system. The X input number if used to establish a timing function associated with breaking of the sensor 100 beam.

As soon as the beam of the sensor 100 is broken, the "out 3" port of the CPU board 152 (FIG. 6A) causes the output conductor 156 from the multifunction board 166 (FIG. 6C) to provide a signal which initiates lowering of the incoming article onto the scale platform and simultaneously interrogates the analog-to-digital converter board 184 (FIG. 6B) over the conductor 182. Thereafter, the CPU sequentially interrogates the input expander board 180 to input the preset BCD number at the X input and interrogates the board 180 to input the preset BCD number at the Y input. The number read by the CPU from the X input determines a first time delay which is to prevail until the lifting mechanism signal at the conductor 156 is restored to its initial condition and the number read by the CPU from the Y input determines a second time delay before the second reading is taken from the A/D converter board 184. As noted, the A/D board 180 is interrogated when the lifting mechanism command to "drop" is applied at the conductor 156 and since the article is not instantaneously lowered onto the scale platform, this first reading from the A/D board is the unladen scale weight. The first time delay is so chosen by the present number at the X input that cessation of the drop command signal occurs only at such time as allows the incoming article at least momentarily to be lowered fully onto the scale platform and the second time delay is so chosen by the preset number at the Y input that the second interrogation of the A/D board 184 occurs while the article is so lowered fully. In this way, the second reading from the A/D board will be the laden scale reading.

FIG. 7 is a schematic of the input expander circuit board 180 shown in FIG. 6A and will be seen to include two integrated circuits 190 and 192 and the integrated circuit 194, the latter functioning primarily as a buffer. The BCP number present on the lines 196, 198, 200 and 202 in conjunction with the enabling signal on the conductor 204 selects either the X input or the Y input, the former consisting of the four conductors 206, 208, 210 and 212 and the latter consisting of the input at the four conductors 214, 216, 218 and 220. This selected input will appear on the output lines 222, 224, 226 and 228 to the CPU board 152 as shown.

The load cell amplifier and filter board 230 of FIG. 6B is illustrated in detail in FIG. 8. The transducer or load cell device indicated generally by the reference character 232 is a strain gauge load cell of conventional construction. The circuit of FIG. 8 employs three integrated circuits of the type LM308AH manufactured by National Semiconductors and indicated respectively by the reference characters 234, 236 and 238. The circuit 234 receives the output of the load cell 232 over the conductors 240 and 242 and performs an amplification with a gain of 62.5 whereas the two circuits 236 and 238 are connected as unity gain amplifiers acting as active low pass filters with a cut off frequency of 20Hz. The output of the circuit of FIG. 8 is at the conductor 244 wherein the change of the voltage output on the conductor 244 is proportional to the change of load on the scale. The purpose of this high gain circuit will be apparent presently.

The analog-to-digital converter board 184 is illustrated in FIG. 9 and contains a commercially available A/D module 246 which is an ADC 1100 manufactured by Analog Devices. The input conductor 244 from the circuit of FIG. 8 is applied through the voltage divider circuit constituted by the potentiometer 248 and resistor 250 so as to provide gain control of the input signal to the circuit 246 from the circuit of FIG. 8.

Ordinarily, the input to the converter 184 would be adjusted to produce a count change output of one hundred counts in response to a scale weight input change of one pound, thereby providing a count output which may be displayed to the hundredth of a pound. However, it is well known that there is an inherent quantization uncertainty of $\pm\frac{1}{2}$ LSB (least significant bit) associated with any A/D system. In the present invention, since the results of two A/D conversions are being subtracted (laden weight minus unladen weight) the resulting resolution is $\pm 1$ LSB. In order to reduce this uncertainty, the input range to the A/D circuit, and consequently its output range, is effectively expanded and subsequent to the subtraction of the outputs, the resulting difference is divided by the expansion factor. In this way, it can be shown that the resolution uncertainty is reduced to $1/n^{th}$ of one hundredth of a pound where n is the aforesaid factor. In a specific embodiment, this factor is four so that the uncertainty becomes 0.010#/4 = 0.0025#.

Specifically, whereas the A/D converter 246 requires an input change of 10 millivolts to produce an output change of 100 counts, the potentiometer 248 is set so that for a change of weight of 1 pound on the scale platform, there will be a change of 40 millivolts at the input to the circuit 246, causing an output count change of 400 counts. Thus, the aforesaid factor n is 4.

As shown in FIG. 9, the sensor 100 is connected to the NE555 chip 254 configured as an inverter and functioning to produce in conjunction with the circuit 256 an output pulse as indicated at reference character 258 whose duration is determined by the setting of a potentiometer 260 in conjunction with a capacitor 262 to provide a lock out against double interrogation when the light beam impinging on the sensor 100 is broken more than one time by an entering package. The output signal on the conductor 264 is applied to the input port 265 of the CPU 152. The data selectors 266 and 268 are of conventional construction as indicated in FIG. 9 and operate in conjunction with the input lines 270 and 272 from the CPU which are the lower two bits of the port 164. This selects the BCD digits in succession from the circuit 246 on command from the CPU and in sequence thereby to appear at the output lines 274, 276, 278 and 280 which are applied back to the CPU 152.

Two display modules as are shown in FIG. 6B as are indicated by reference characters 300 and 306 there, and provided for providing the display at 120 in FIG. 5. Specifically the display module 300 provides the display for the net package weight at 122 and the package price at 124. The display at 122 is under command of the CPU 152 in response to the two weighing signals and the computation effected in response thereto and the display at 124 is the result of the computation of the package price based upon the net package weight as computed by the computer. The two displays at 126 and 128 are controlled by the module 306 and are set by keyboard entry at 118 or, optionally, the tare weight may be set by passing the product container over the scale platform to take its weight. Once the set tare button 132 is depressed, the tare entered into the computer memory may be accepted either from the keyboard 118 or by passing an empty package over the scale mechanism. If the tare is entered from the scale device, the entry will be only to the nearest one hundredth of a pound and the last digit of the display will be zero. Likewise, the button 134 is depressed to enter the price per pound from the keyboard 118, which entry is displayed at 128.

The printer interface board 308 is constructed to be compatible with the particular printer utilized in the labeling section of the machine, same forming no part of the present invention. However, the output port 310 of the CPU board 152 provides the input control signals for the printer. The BCD numbers on the output lines 311 of the printer interface correspond to the character in position to be printed and are applied to the input port 312.

The logic flow diagrams of FIGS. 10–14 serve to illustrate the manner in which the processing assembly is to be programmed in order to perform the various operations described hereinabove. Although these Figures are believed largely self-explanatory, a brief description will be given.

Figure 10:
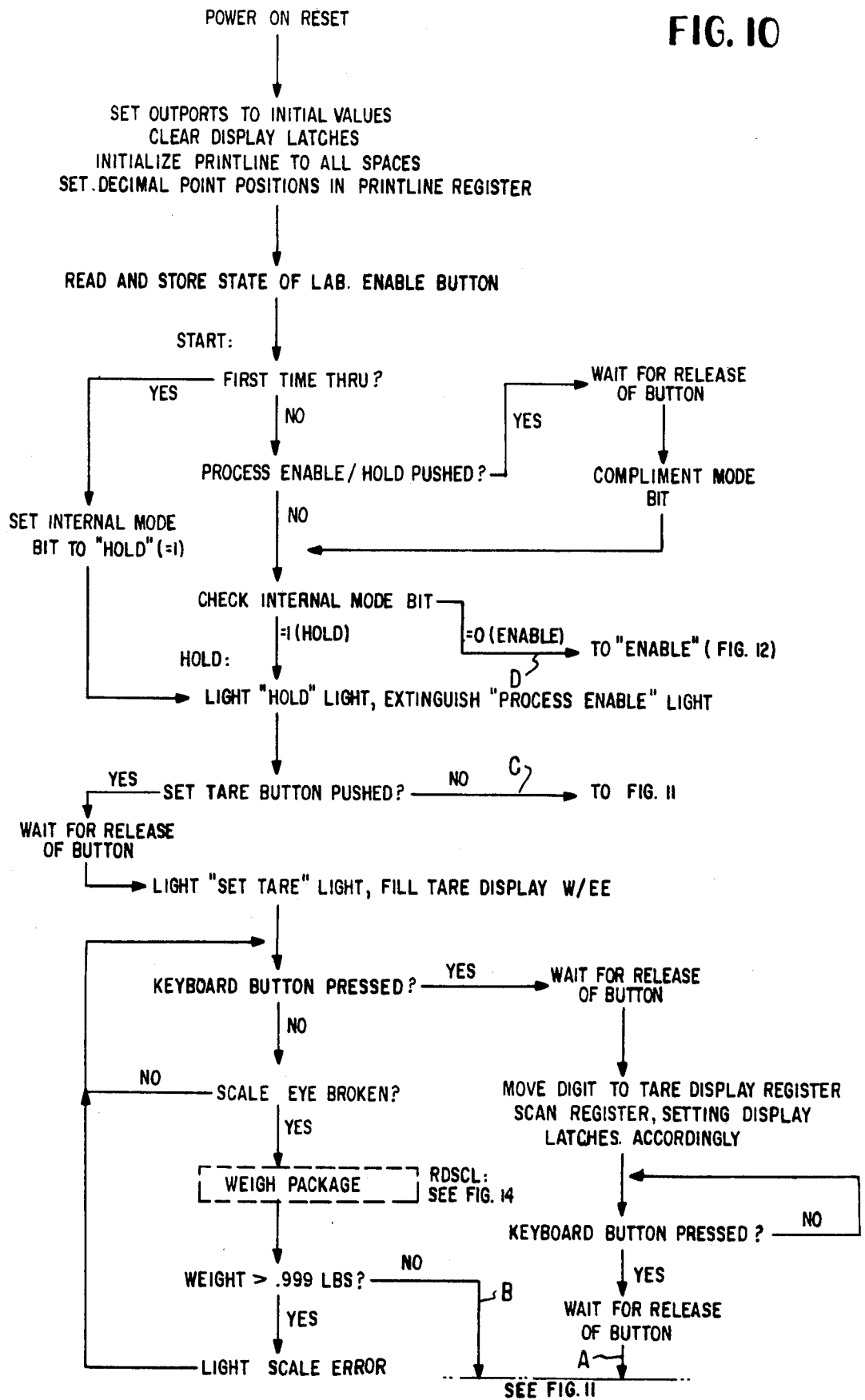

Starting with FIG. 10, when the device is powered up, various initial values are set up as indicated and the state of label/enable button is read and stored. Since at this time beginning at the position "start" this will be the first time through, the internal mode bit is set to −1 (hold) and the hold section of the switch button 130 is back-lighted. It is assumed at this time that the tare button has not been depressed and so the logic flows through the branch C to the corresponding branch of FIG. 11. It will be also assumed at this time that the price per pound button has not been pushed and so the lamp test button LT which is the key at the lower right-hand corner of the register 118 in FIG. 5 is interrogated. Assuming that this lamp test button is depressed prior to other operations, it will be seen from FIG. 11 that all lights are lit and eights are latched into the display latches and this condition prevails so long as the lamp test button is depressed. When it is released, the displays and lights are restored to their initial condition. This initial test of course allows checking of all lights and displays. At this time, the logic cycles back to start of FIG. 10 and since this now is not the first time through, the process enable/hold switch is first interrogated and assuming at this time that this button is not pressed, the internal mode bit will be checked which, as aforesaid is set to =1 (hold). Assuming now that the tare button is being pushed, the logic flow will pause and wait for release of the button. The "set tare" switch button 132 will be back-lit and the tare display will be filled with E's. If a keyboard button is not pressed, provision is made for accepting tare entry from the scale which is detected by the scale eye which, if broken, causes the package to be weighed and if this weight is not greater than 0.999 pounds, the logic will cycle through branch B to FIG. 11. This interrogation of the weight is provided to prevent a tare setting greater than 0.999 pounds, since it is not contemplated in the specific embodiment that the tare weight will ever be set to such a high value. Thus, if the tare weight is greater than 0.999 pounds, the scale error display button 138 will be back-lit. If, on the other hand, the tare weight is not excessive, the logic cycles through the line B to the corresponding portion of FIG. 11 wherein the measured weight is moved to the tare display and the set tare and the "scale error" lights are turned off and, the measured weight is moved to the tare store section of the RANDOM ACCESS MEMORY and the cycle goes back to start.

Figure 11:
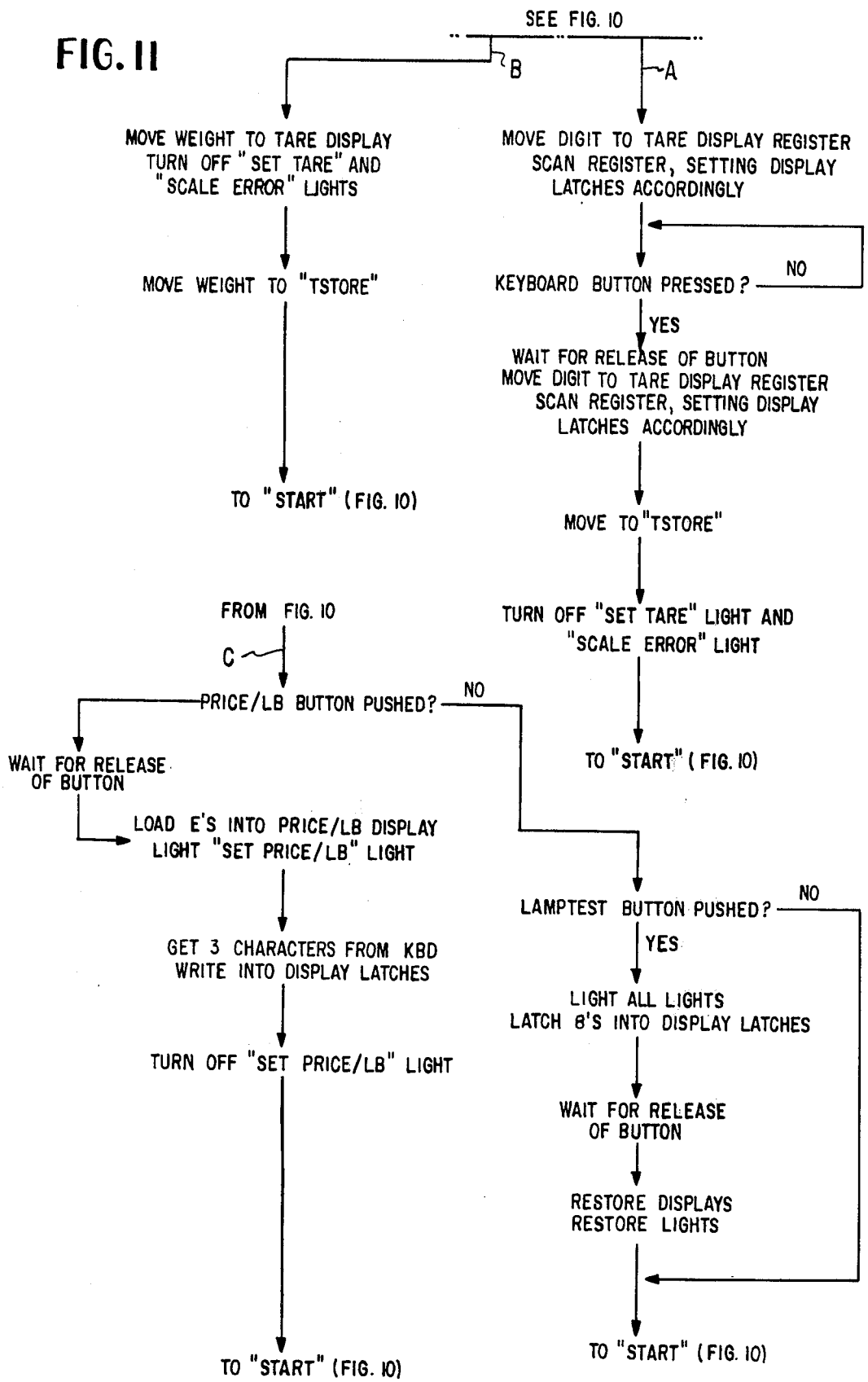

If, on the other hand, the tare button has been pushed and a keyboard button is pressed, the corresponding digit is moved to the tare display register, the register scanned and the display latch is set accordingly and when the next keyboard button is pressed as shown at the line A at the bottom of FIG. 10, the logic continues to the corresponding line A in FIG. 11, the new digit being moved to the tare display register which is scanned and the display latches set accordingly. The third keyboard button entry for tare is then made and the three digits are then moved to the tare storage section of the RAM as described hereinabove, the set tare light and scale error light are turned off and the cycle goes back to start in FIG. 10.

From start, if the set tare button is now not depressed, the logic will cycle again through the line C in FIG. 10 to the corresponding line in FIG. 11 and if now the price per pound button is depressed, E's will be loaded into the price per pound display and the switch button 134 will be back-lit. Then three characters are obtained from the keyboard and written into the display latches, in a manner similar to the entry of three tare digits as above described. The "set price/lb" light is turned off and the logic cycles back to start in FIG. 10.

Figure 12:
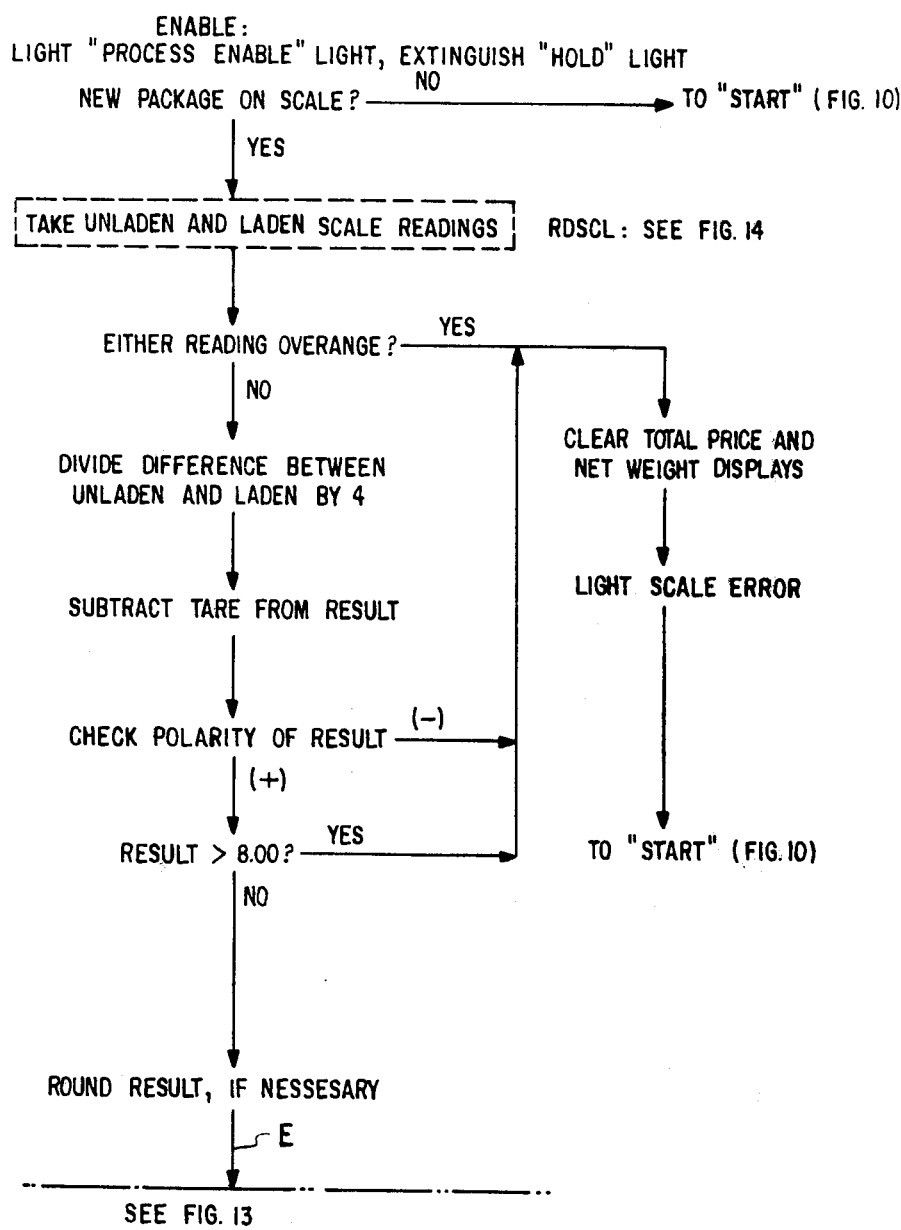
Figure 13:
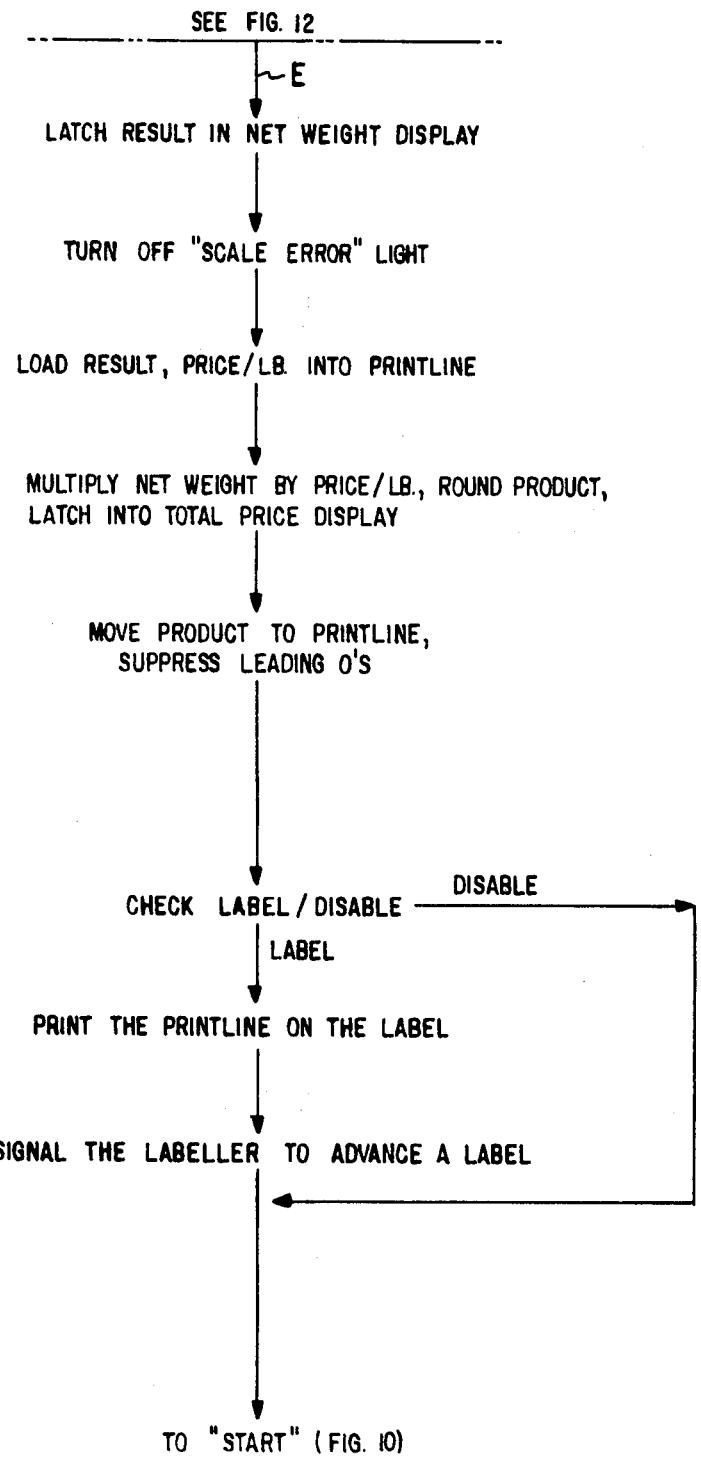
Figure 14:
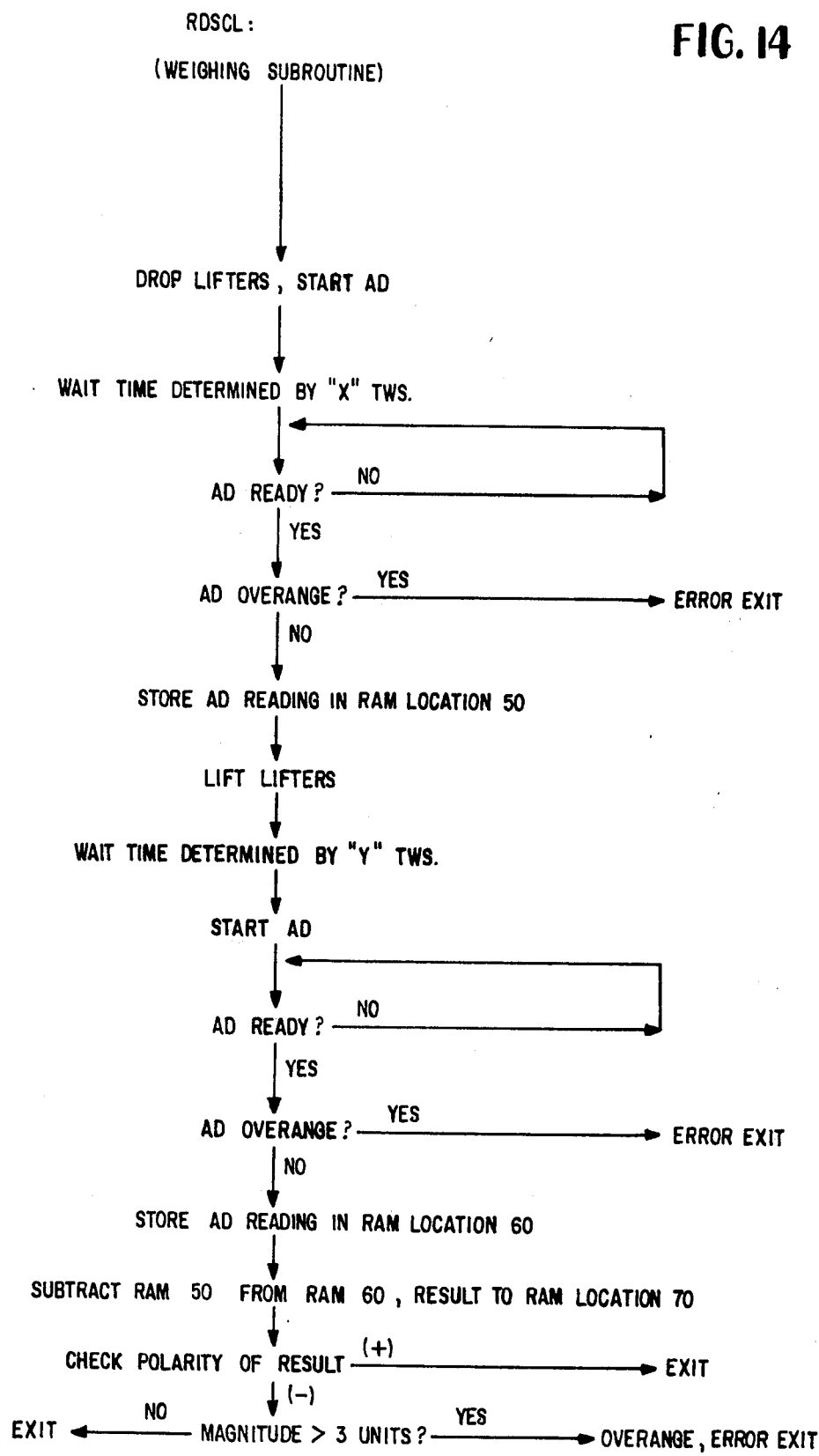

If now the momentary switch button 130 is depressed, the internal representation hold is terminated and the logic will flow to the line D in FIG. 10 to flow to "enable" in FIG. 12. If there is a new package on the scale, the read scale subroutine of FIG. 14 is performed and if neither reading is over range, the difference is divided by four, the tare entry is subtracted from the result and its polarity checked. Since in the specific embodiment disclosed herein it is not intended to accommodate packages greater than 8 pounds, a check is made on the result and if it is within the proper range, the result is rounded if necessary and, progressing through the line E to FIG. 13, the result is latched into the net weight display, provision is made to turn off the scale error light, the result and the price per pound are entered into the print line, the net weight is multiplied by the price per pound, the product is rounded and is latched into the total price display, the product is moved to the print line with suppression of the leading zeros and if the machine is in the label mode, the print line is printed on the label and the labeler is signaled to advance a label for application to the package and the cycle goes back to start in FIG. 10.

The weighing subroutine of FIG. 14 serves to illustrate further the timing provided by the X and Y inputs mentioned previously. As will be seen from FIG. 14, the read scale or weighing subroutine drops the lifters 88 and starts the analog-to-digital converter. After the time determined by the setting of the X input thumb switches, the analog-to-digital converter is interrogated and if it is ready, its output is stored in RAM location 50, any overrange being effective to produce an error exit. Thereafter, the lifters are initiated in their lifting cycle and the time set by the Y input thumb switches determines the delay until the second interrogation of the A/D unit, the A/D output is stored in RAM location 60. Next, the reading stored in RAM location 50 is subtracted from the reading stored in the RAM location 60 and the result is placed in RAM location 70. It will be appreciated that the reading stored in RAM location 50 is the unladen scale reading whereas the reading which is stored in RAM location 60 is the laden scale reading. If there is no error in polarity or in magnitude, the flow of logic exits the subroutine to resume after the point where the subroutine was invoked.

As has been noted hereinabove, two weight determinations are made for each package or article being processed, one weight reading corresponding to the unladen platform and the other corresponding to the laden platform. In this fashion, the unladen platform or zero reading may float without introducing error. The zero level correponding to the unladen platform is initially adjusted to some offset value by means of the potentiometer PT in FIG. 8.

What is claimed is:

1. In a high speed weight computing system, in combination:
    weight-sensitive means for producing an output signal in response to weight acting thereon;
    conveyor means for conveying articles along a path passing over said weight-sensitive means and including control means for transiently depositing said articles on said weight-sensitive means;
    sensor means for actuating said control means transiently to deposit an article on said weight-sensitive means; and computer means interfaced with said sensor means and with said weight-sensitive means for computing the gross weight of an article based upon the difference in outputs of said weight-sensitive means when an article is transiently deposited on the weight-sensitive means and when the article is not on the weight-sensitive means, said weight-sensitive means producing an analog output signal linearly proportional to weight, and including amplifier means connected to the analog output signal, and an analog-to-digital converter connected to the output of the amplifier means, said amplifier means amplifying the output signal to produce a difference in digital outputs from said converter which represents the measured load times a factor $m$ and said computer means computing said gross weight on the basis of said difference in output signals divided by said factor $m$ whereby to minimize weight computation errors due to converter inaccuracy in converting to the least significant bit of the output thereof.

2. In a high speed weight computing system as defined in claim 1 including a keyboard interfaced with said computer means, and control switch means for entering tare weight data from said keyboard into said computer means, and display means interfaced with said computer means for displaying net weight of an article based upon said computer gross weight less said tare weight data.

3. In a high speed weight computing system as defined in claim 2 including further control switch means for entering price per unit weight data from said keyboard into said computer means, said display means also displaying article price based upon the computed net weight times said price per unit weight data.

4. In a weight computing system, in combination:
scale means for producing an analog output signal linearly proportional to weight and having a capacity covering an output signal range $a$;
amplifier and analog-to-digital converter means connected to said scale means for producing digital data representing weight sensed by the scale means multiplied by a factor $m$;
computer means receiving said digital data; and
control means connected to said computer means receiving successive digital data from the amplifier and converter means just before and during placement of an article on the scale means, said computer means being effective to compute gross weight of the article by computing the difference between said successive data and dividing the result by said factor $m$ whereby to decrease error due to inaccuracy in the least significant bit of said successive data.

5. In a high speed weight computing system as defined in claim 4 including a keyboard intefaced with said computer means, and control switch means for entering tare weight data from said keyboard into said computer means, and display means interfaced with said computer means for displaying net weight of an article based upon said computed gross weight less said tare weight data.

6. In a high speed weight computing system as defined in claim 5 further control switch means for entering price per unit weight data from said keyboard into said computer means, said display means also displaying article price based upon the computed net weight times said price per unit weight data.

7. In a price labeling system which includes a weight-responsive transducer having an analog output signal which is highly linear over a predetermined weight range, and conveyor means for transiently causing a succession of articles within said weight range to act upon said transducer whereby said transducer produces a first analog output signal immediately prior to the time an article acts thereon and a second analog output signal while an article acts thereon, the difference between said first and second analog output signals indicating to a high degree of accuracy the gross weight of the article associated with such signals, the improvement which comprises:
an analog-to-digital converter and amplifier means connecting said transducer to said analog-to-digital converter for causing said converter to produce respective first and second digital outputs corresponding to said first and second analog output signals in which the difference between said first and second digital outputs is a multiple $m$ of said gross weight of an article, where $m$ is much larger than one; and
processing means connected with said analog-to-digital converter for computing the gross weight of an article from said first and second digital outputs.

8. In a price labeling system as defined in claim 7 including means for entering a set tare weight and a price per unit weight into said processor means, said processor means computing the net weight and price of an article.

9. In a price labeling system as defined in claim 7 including a keyboard for entering digital data into said processing means corresponding to price per unit weight and estimated tare weight of an article.

10. In a price labeling system as defined in claim 9 wherein said tare weight data is entered to the nearest thousandth of a pound.

11. In a weighing system, the combination of:
conveyor means for transporting a succession of articles and scale means having a weight-responsive member upon which each of said articles is transiently rested, said scale means producing an analog output signal whose change in magnitude represents weight acting thereon;
amplifier and converter means connected with said scale means to produce digital output signals expanded by a factor $m$ compared with the magnitudes of the normal unexpanded analog output signals of said scale means;
computer means connected to said amplifer and converter means for receiving digital output signals from said amplifier and converter means corresponding to laden scale member and unladen scale member weights for each article, for subtracting such digital signals and for dividing the result by said factor $m$ to produce a highly accurate measure of gross article weight for each article.

12. In a weighing system as defined in claim 11 including a visual display mechanism connected with said computer means for displaying net weight of each article, said computer means being provided with article tare weight entry.

13. In a weighing system, the combination of:
conveyor means for transporting a succession of articles and scale means having a weight-responsive member upon which each of said articles is transiently rested, said scale means producing an analog output signal whose magnitude is proportional to weight acting thereon plus an offset;

amplifier and analog-to-digital converter means connected with said scale means to produce digital output signals whose range is expanded by a factor $m$ compared with the range of the normal, unexpanded analog output signals of said scale means;

computer means connected to said analog-to-digital converter means for receiving digital output signals from said converter corresponding to laden scale member and unladen scale member weights for each article, for subtracting such digital signals and for dividing the result by said factor $m$ to produce a highly accurate measure of gross article weight for each article.

14. In a weighing system as defined in claim 14 including a visual display mechanism connected with said computer means for displaying net weight of each article, said computer means being provided with article tare weight entry.

* * * * *

UNITED STATES PATENT AND TRADEMARK OFFICE
CERTIFICATE OF CORRECTION

PATENT NO. : 4,049,068
DATED : September 20, 1977
INVENTOR(S) : George Kavanagh and John L. Caron It is certified that error appears in the above-identified patent and that said Letters Patent are hereby corrected as shown below:

Column 1, line 64, change "zero 0" to ---"zero"---;

line 66, change "zero" to ---"zero"---.

Column 2, line 22, change "zero" to ---"zero"---.

Column 5, lines 18, 22, 23 and 32, change "zero" to ---"zero"---.

Column 7, line 4, change "drop" to ---"drop"---;

line 16, change "BCP" to ---BCD---.

Column 9, line 2, change "-1" to ---=1---;

line 3, "(hold)" should be ---("hold")---;

line 9, change "LT" to ---"LT"---;

line 18, change "start" to ---"start"---;

line 23, change "(hold)" to ---("hold")---;

lines 41 and 58, change "set tare" to ---"set tare"---;

lines 46 and 60, change "start" to ---"start"---;

line 59, change "scale error" to ---"scale error---.

UNITED STATES PATENT AND TRADEMARK OFFICE
CERTIFICATE OF CORRECTION

PATENT NO. : 4,049,068
DATED : September 20, 1977
INVENTOR(S) : George Kavanagh and John L. Caron It is certified that error appears in the above-identified patent and that said Letters Patent are hereby corrected as shown below:

Column 9, line 61, change "set tare" to ---"set tare"---.

Column 10, line 2, change "start" to ---"start"---;

Column 10, line 4, change "hold" to ---"hold"---;

Column 10, line 25, change "start" to ---"start"---;

Column 10, line 52, change "zero" to ---"zero"---;

Column 10, line 52, change "zero" to ---"zero"---.

Column 11, line 56, change "intefaced" to ---interfaced-

Column 11, line 64, change "claim 5 further" to

---claim 5 including further---.

UNITED STATES PATENT AND TRADEMARK OFFICE
CERTIFICATE OF CORRECTION

PATENT NO. : 4,049,068
DATED : September 20, 1977
INVENTOR(S) : George Kavanagh and John L. Caron It is certified that error appears in the above-identified patent and that said Letters Patent are hereby corrected as shown below:

Column 6, line 21, change "160." to ---160---.

Column 14, line 6, change "14" to ---13---.

Signed and Sealed this

Second Day of May 1978

[SEAL]

Attest:

RUTH C. MASON
Attesting Officer

LUTRELLE F. PARKER
Acting Commissioner of Patents and Trademarks